United States Patent
Klassen (10) Patent No.: US 7,653,983 B1
(45) Date of Patent: Feb. 2, 2010

(54) MANUFACTURING ASSEMBLY FOR MANUFACTURING A DISK DRIVE

(75) Inventor: Andrew S. Klassen, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 406 days.

(21) Appl. No.: 11/768,430

(22) Filed: Jun. 26, 2007

(51) Int. Cl.
*G11B 5/127* (2006.01)
(52) U.S. Cl. .................. 29/603.03; 29/603.04; 29/607; 360/254.9
(58) Field of Classification Search .............. 29/603.03, 29/603.04, 607; 360/240, 250, 254.9
See application file for complete search history.

(56) References Cited

U.S. PATENT DOCUMENTS

| | | | |
|---|---|---|---|
| 4,851,943 A | 7/1989 | Perry | |
| 5,826,325 A | 10/1998 | Price et al. | |
| 6,032,352 A * | 3/2000 | Furay et al. | 29/603.03 |
| 6,049,969 A * | 4/2000 | Jenkins et al. | 29/737 |
| 6,344,950 B1 | 2/2002 | Watson et al. | |
| 6,487,052 B1 | 11/2002 | Macpherson et al. | |
| 6,543,124 B2 | 4/2003 | Eckerd et al. | |
| 6,577,473 B1 | 6/2003 | Macpherson et al. | |
| 6,862,154 B1 | 3/2005 | Subrahmanyam et al. | |
| 6,941,642 B1 | 9/2005 | Subrahmanyam et al. | |
| 6,959,487 B2 | 11/2005 | Pfeiffer | |
| 6,966,107 B2 * | 11/2005 | Jones | 29/603.03 |
| 7,536,771 B2 * | 5/2009 | Sheu et al. | 29/603.06 |
| 2005/0223547 A1 * | 10/2005 | Pfeiffer et al. | 29/737 |
| 2006/0117558 A1 | 6/2006 | Koh et al. | |

\* cited by examiner

*Primary Examiner*—Derris H Banks
*Assistant Examiner*—Azm Parvez
(74) *Attorney, Agent, or Firm*—Howard H. Sheerin, Esq.

(57) ABSTRACT

A manufacturing assembly is disclosed for manufacturing a disk drive. The manufacturing assembly comprises a pre-merge arm having a contact surface for contacting an actuator arm of the disk drive, and an actuator operable to actuate the pre-merge arm. When installing the actuator arm into the base of the disk drive, the actuator is operable to actuate the pre-merge arm in a first direction so that the contact surface biases the actuator arm rotationally about a pivot to bias the lift tab away from the ramp. After installing the actuator arm into the base of the disk drive, the actuator is operable to actuate the pre-merge arm in a second direction opposite the first direction so that the lift tab moves towards and contacts a ramp near an outer periphery of a disk.

16 Claims, 10 Drawing Sheets

MANUFACTURING ASSEMBLY FOR MANUFACTURING A DISK DRIVE

BACKGROUND

1. Field

The present invention relates to manufacturing disk drives for computer systems. In particular, the present invention relates to a manufacturing assembly for manufacturing a disk drive.

2. Description of the Related Art

Disk drives comprise a disk and a head connected to a distal end of an actuator arm which is rotated about a pivot by a voice coil motor (VCM) to position the head radially over the disk. When the disk drive is powered down or idled, the head is typically parked either on a landing zone of the disk, or on a ramp near an outer periphery of the disk. In disk drives that employ ramp loading/unloading, the actuator arm comprises a "lift tab" that extends out over the head which contacts and slides along the ramp. During manufacturing, a head stack assembly (HSA) comprising an actuator arm is installed into the base of the disk drive, and then rotated so that the lift tab makes initial contact with an outer edge of the ramp during a "pre-merge" operation. Thereafter a "merge" operation is performed to further rotate the actuator arm so that the lift tab slides further onto the ramp and into a parked position on the ramp.

In a prior art technique for manufacturing the disk drive, a "gripper" tool grips the HSA, removes the HSA from a tray, and then inserts the HSA into the base of the disk drive. A screw is then driven through the bottom of the base into the pivot of the HSA in order to secure the HSA to the machined, level surface of the base. Once the HSA is secured to the base, the gripper releases the HSA allowing it to rotate about the pivot until the lift tab contacts the outer surface of the ramp. Screwing the HSA to the base before releasing the gripper helps ensure the HSA rotates in a near perfect horizontal plane which prevents damage to the head as the lift tab contacts the outer edge of the ramp. However, driving a screw through the bottom of the base to secure the HSA increases the cost and complexity of manufacturing the disk drive.

There is, therefore, a need to reduce the cost and complexity of manufacturing a disk drive while maintaining adequate yield.

SUMMARY OF THE EMBODIMENTS OF THE INVENTION

An embodiment of the present invention comprises a manufacturing assembly for manufacturing a disk drive, the disk drive comprising a base, a disk, a ramp near an outer periphery of the disk, and a head coupled to a distal end of an actuator arm. The actuator arm comprises a lift tab and the actuator arm is rotatable about a pivot. The manufacturing assembly comprises a pre-merge arm having a contact surface for contacting the actuator arm, and an actuator operable to actuate the pre-merge arm. When installing the actuator arm into the base of the disk drive, the actuator is operable to actuate the pre-merge arm in a first direction so that the contact surface biases the actuator arm rotationally about the pivot to bias the lift tab away from the ramp. After installing the actuator arm into the base of the disk drive, the actuator is operable to actuate the pre-merge arm in a second direction opposite the first direction so that the lift tab moves towards and contacts the ramp.

In one embodiment, the lift tab moves substantially in-plane with the plane of the disk.

In another embodiment, the pre-merge arm comprises a body and a detachable component coupled to the body, wherein the detachable component comprises the contact surface. In one embodiment, the detachable component comprises a first metal, and in one embodiment, the body comprises a second metal having a hardness less than a hardness of the first metal.

In yet another embodiment, the disk drive further comprises a magnet operable to bias the actuator arm so that the lift tab moves towards and contacts the ramp after the first actuator actuates the pre-merge arm in the second direction opposite the first direction. In one embodiment, the magnet forms at least part of a voice coil motor operable to actuate the actuator arm, and in one embodiment, the actuator arm comprises a magnetic slug operable to interact with the magnet.

In still another embodiment, the manufacturing assembly further comprises a gripper operable to grip the actuator arm, and a second actuator operable to actuate the gripper toward the base of the disk drive. The second actuator actuates the gripper to press the actuator arm onto the base of the disk drive, and thereafter the first actuator actuates the pre-merge arm in the second direction opposite the first direction so that the lift tab moves towards and contacts the ramp, and thereafter the gripper releases the actuator arm, and thereafter the second actuator actuates the gripper away from the actuator arm.

Another embodiment of the present invention comprises a method of manufacturing a disk drive, the disk drive comprising a base, a disk, a ramp near an outer periphery of the disk, and a head coupled to a distal end of an actuator arm, wherein the actuator arm comprises a lift tab and the actuator arm is rotatable about a pivot. The method comprises, when installing the actuator arm into the base of the disk drive, first biasing the actuator arm rotationally about the pivot to bias the lift tab away from the ramp, and after installing the actuator arm into the base of the disk drive, removing the first biasing so that the lift tab moves towards and contacts the ramp.

Another embodiment of the present invention comprises a method of manufacturing a disk drive, the disk drive comprising a base, a disk, a ramp near an outer periphery of the disk, and a head coupled to a distal end of an actuator arm, wherein the actuator arm comprises a lift tab and the actuator arm is rotatable about a pivot. The method comprises gripping the actuator arm, biasing the actuator arm rotationally about the pivot to bias the lift tab away from the ramp while moving the actuator arm toward the base of the disk drive, after installing the actuator arm into the base of the disk drive, removing the biasing, and ungripping the actuator arm so that the lift tab moves towards and contacts the ramp.

DETAILED DESCRIPTION OF EMBODIMENTS OF THE INVENTION

Figure 1A:
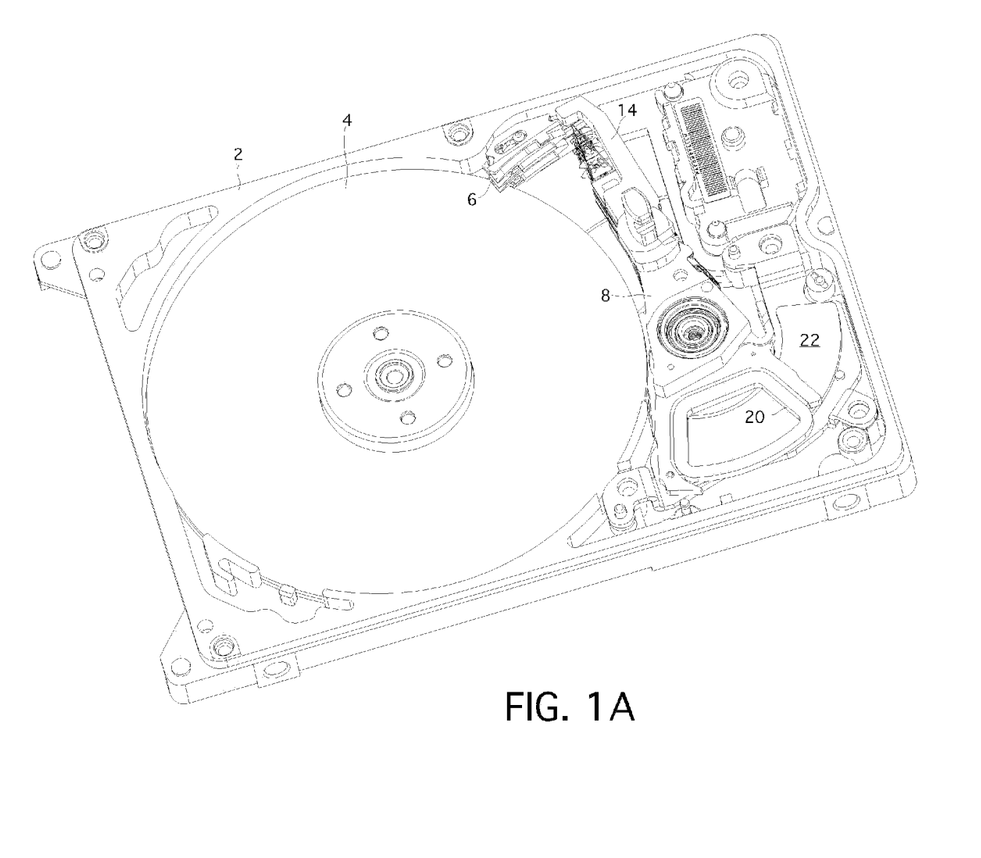
FIG. 1A illustrates a disk drive being manufactured according to an embodiment of the present invention after installing the HSA into the base of the disk drive.

FIG. 1A show a disk drive according to an embodiment of the present invention comprising a base 2, a disk 4, a ramp 6 near an outer periphery of the disk 4, and a head coupled to a distal end of an actuator arm 8. The actuator arm 8 comprises a lift tab 10 (FIG. 1B) and the actuator arm 8 is rotatable about a pivot. When installing the actuator arm 8 into the base 2 of the disk drive, the actuator arm is biased rotationally about the pivot to bias the lift tab 10 away from the ramp 6, and after installing the actuator arm 8 into the base 2 of the disk drive, the biasing is removed so that the lift tab 10 moves towards and contacts the ramp 6.

Figure 1B:
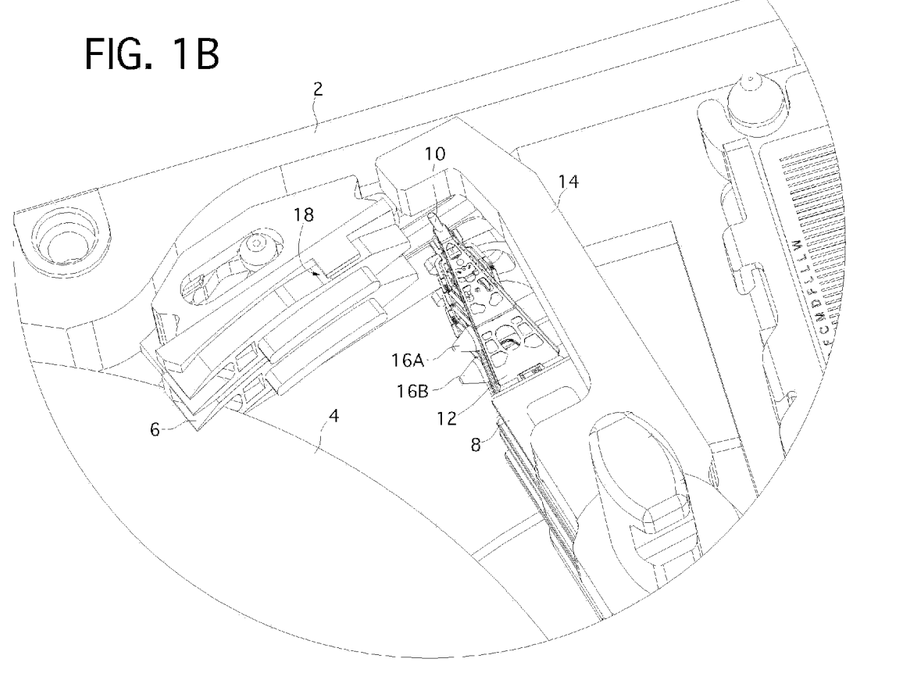
FIG. 1B shows a magnified view of the suspension coupled to the end of the actuator arm, and the lift tab coupled to the end of the suspension.

In the embodiment shown in FIGS. 1A and 1B, the lift tab 10 and head are coupled to the distal end of the actuator arm 8 through a suspension 12 which biases the head toward the surface of the disk 4 during normal operation. FIG. 1B also shows a shipping comb 14 coupled to the actuator arm 8 with fingers 16A and 16B inserted between the suspensions which helps protect the heads during shipping. During a merge operation, when the lift tabs 10 are moved into a parked position 18 on the ramp 6, the shipping comb 14 is removed. Not all components of the disk drive are shown in FIG. 1A, such as the flex circuit which provides the electrical connections from the heads (and pre-amp) to the control circuitry of the disk drive.

The disk drive shown in the embodiment of FIG. 1A comprises a voice coil motor (VCM) for rotating the actuator arm 8 about the pivot. The VCM comprises a voice coil 20 coupled to a base end of the actuator arm 8, and at least one permanent magnet 22 coupled to the base 2 of the disk drive. In one embodiment, the permanent magnet comprises a bottom magnet 22 and a top magnet (not shown). When current is applied to the voice coil 20 the resulting magnetic flux interacts with the flux emanating from the permanent magnet 22 which generates a torque that rotates the actuator arm 8 about the pivot.

Figure 2:
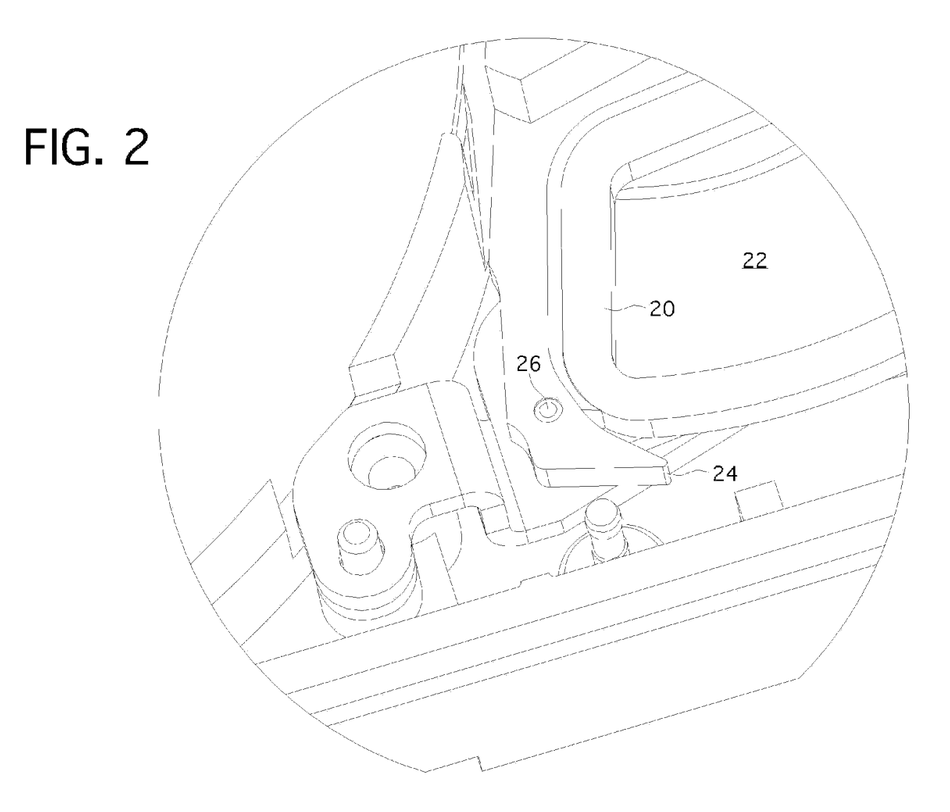
FIG. 2 shows a magnified view of a magnetic slug integrated into the actuator arm for interacting with the bottom magnet of the voice coil motor.

FIG. 2 shows a magnified view of the voice coil 20 and permanent magnet 22, including a hook element 24 of the actuator arm 8 that forms part of an inertial latch, as well as a magnetic slug 26 which interacts with the permanent magnet 22 to implement a parking latch. The parking latch helps maintain the lift tabs 10 in the parked position 18 (FIG. 1B) on the ramp 6 when the disk drive is subject to small rotational shocks. When the disk drive is subject to large rotational shocks, a latching element (not shown) of the inertial latch rotates and interacts with the hook element 24 to prevent the actuator arm 8 from rotating. In one embodiment, the biasing force from the magnetic slug 26 interacting with the permanent magnet 22 of the VCM rotates the actuator arm 8 about the pivot after installing the actuator arm 8 into the base 2, thereby causing the lift tabs 10 to move toward and contact the ramp 6.

Figure 3A:
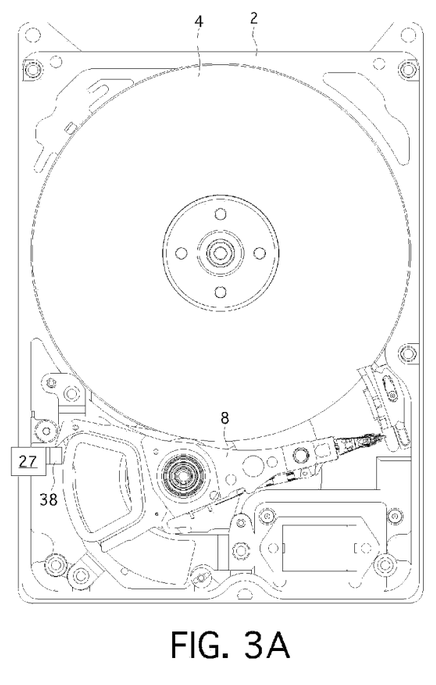
FIG. 3A is a top view of the disk drive showing the actuator arm in an initial position after being inserted into the base of the disk drive.
Figure 3B:
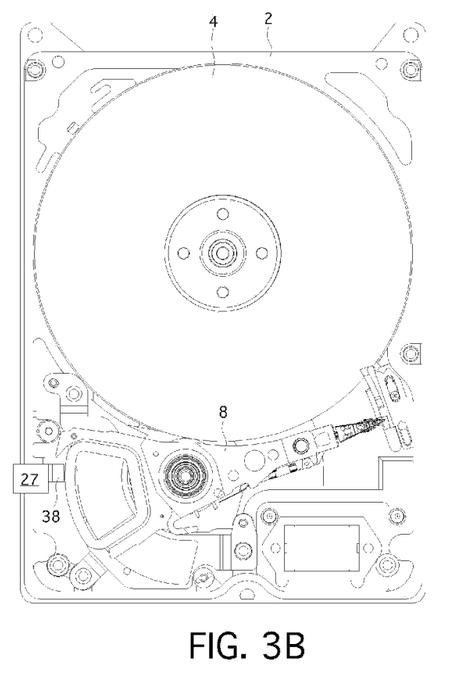
FIG. 3B is a top view of the disk drive showing the actuator arm rotated until the lift tab contacts the ramp.

FIG. 3A is a top view of the disk drive showing the position of the actuator arm 8 after installing the actuator arm 8 into the base 2, wherein a first biasing force is applied to the actuator arm 8 by a pre-merge arm 27 (described below with reference to FIG. 4) in order to bias the actuator arm 8 rotationally about the pivot to bias the lift tabs 10 away from the ramp 6. In the embodiment shown in FIG. 3A, the pre-merge arm 27 applies the first biasing force by pressing a contact surface 38 against the hook element 24 (FIG. 2) of the inertial latch. However, the pre-merge arm 27 may apply the first biasing force at any suitable point on the actuator arm 8. After installing the actuator arm 8 into the base 2, the pre-merge arm 27 removes the first biasing force so that the biasing force of the magnetic slug 26 interacting with the permanent magnet 22 rotates the actuator arm 8 about the pivot, thereby causing the lift tabs 10 to move toward and contact the ramp 6 as shown in FIG. 3B. The biasing force generated by the magnetic slug 26 continues to press the lift tabs 10 against the ramp 6 until the merge operation pushes the lift tabs 10 onto the ramp 6 and into the parked position 18 (FIG. 1B). For clarity, the shipping comb 14 shown in FIG. 1B is not shown in FIGS. 3A and 3B.

Figure 4:
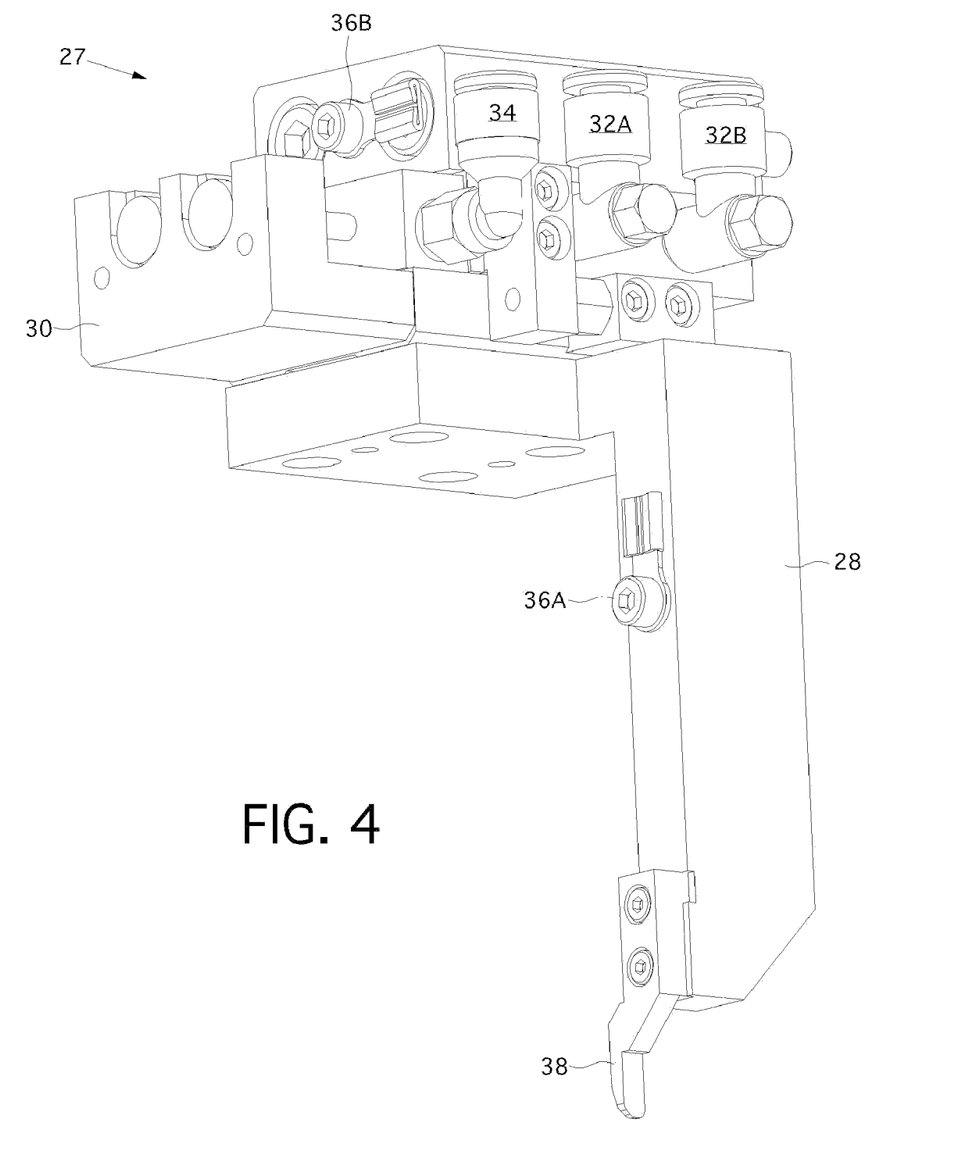
FIG. 4 shows a pre-merge arm according to an embodiment of the present invention for biasing the actuator arm and lift tabs away from the ramp when installing the HSA.

Any suitable manufacturing assembly may be used to apply the first rotational biasing force on the actuator arm 8 in order to bias the lift tabs 10 away from the ramp 6 when installing the actuator arm 8 into the base 2. FIG. 4 shows an embodiment of a suitable manufacturing assembly comprising a pre-merge arm 27 including a body 28 that is air-actuated by a slide table 30 using a suitable air piston. An example slide table 30 that may be employed in the embodiments of the present invention is slide table MXS6-10A-M9BL manufactured by SMC Corporation of America. The slide table 30 shown in FIG. 4 comprises an input air terminal 32A and an output air terminal 32B for actuating a piston and thereby slide the table along a piston rod. Since the friction generated from actuating the slide table 30 may cause the moving components to emit particle contaminants, the slide table 30 shown in FIG. 4 also comprises a scavenger vacuum air terminal 34 which sucks the particle contaminants into an appropriate holding container to help prevent contaminating the manufactured disk drives. The pre-merge arm 27 shown in FIG. 4 also comprises ring terminals (e.g., ring terminals 36A and 36B) that are wired to ground to help protect the heads from electrostatic discharge.

In one embodiment, the pre-merge arm comprises a detachable component 38 coupled to the body 28, wherein the detachable component 38 comprises a contact surface that contacts the actuator arm 8. In one embodiment, the detachable component 38 is made from a metal having a sufficient hardness to attain high precision, low wear, and low contamination. For example, the detachable component 38 may comprise a suitable steel, such as a suitable 300 or 400 series stainless steel, or it may comprise another suitable metal (or metals), such as Inconel alloy (a nickel alloy) or cobalt. Since a hardened metal is typically more expensive, in one embodiment the body 28 of the pre-merge arm comprises a less expensive metal having a hardness less than that of the detachable component 38. In addition, a suitable fastener is used to couple the detachable component 38 to the body 28 which allows the detachable component 38 to be replaced periodically without having to replace the entire pre-merge arm.

Figure 5A:
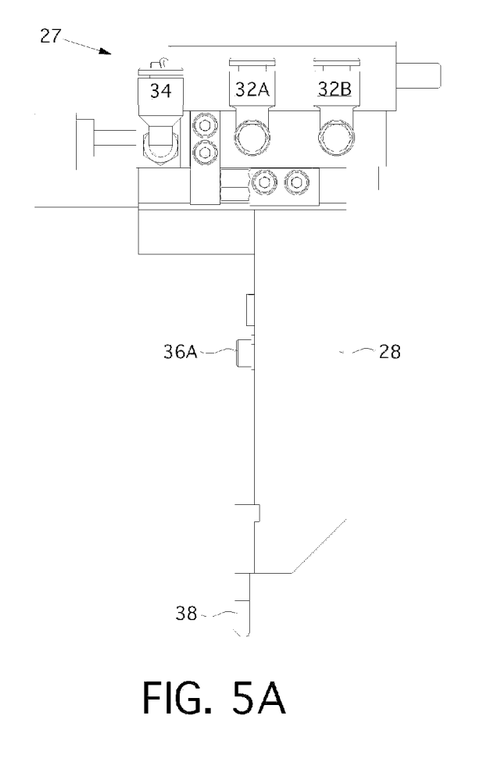
FIG. 5A shows a side view of the pre-merge arm in a first position for applying the bias to the actuator arm.
Figure 5B:
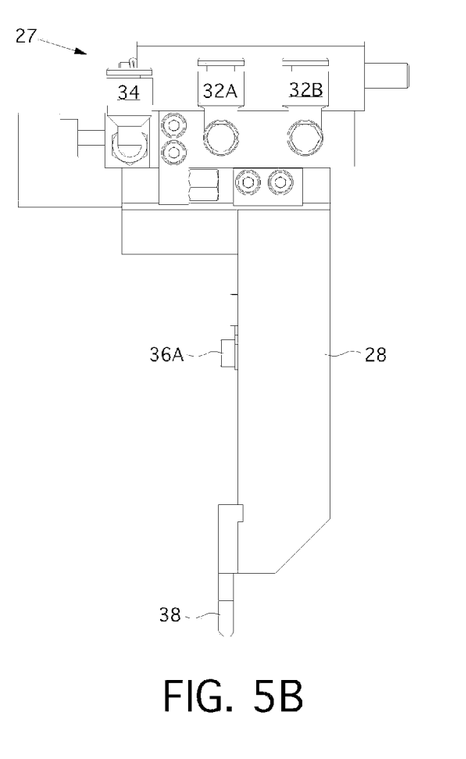
FIG. 5B shows a side view of the pre-merge arm in a second position after removing the biasing from the actuator arm.

FIG. 5A shows a side view of the pre-merge arm 27 after being actuated into a first position wherein the detachable component 38 would be pressing on the hook element 24 of the actuator arm 8 (FIG. 2) in order to bias the actuator arm 8 rotationally about its pivot in order to bias the lift tabs 10 away from the ramp 6. After installing the actuator arm 8 into the base, the pre-merge arm 27 is actuated in an opposite direction as illustrated in FIG. 5B in order to remove the biasing force applied to the actuator arm 8.

Figure 6A:
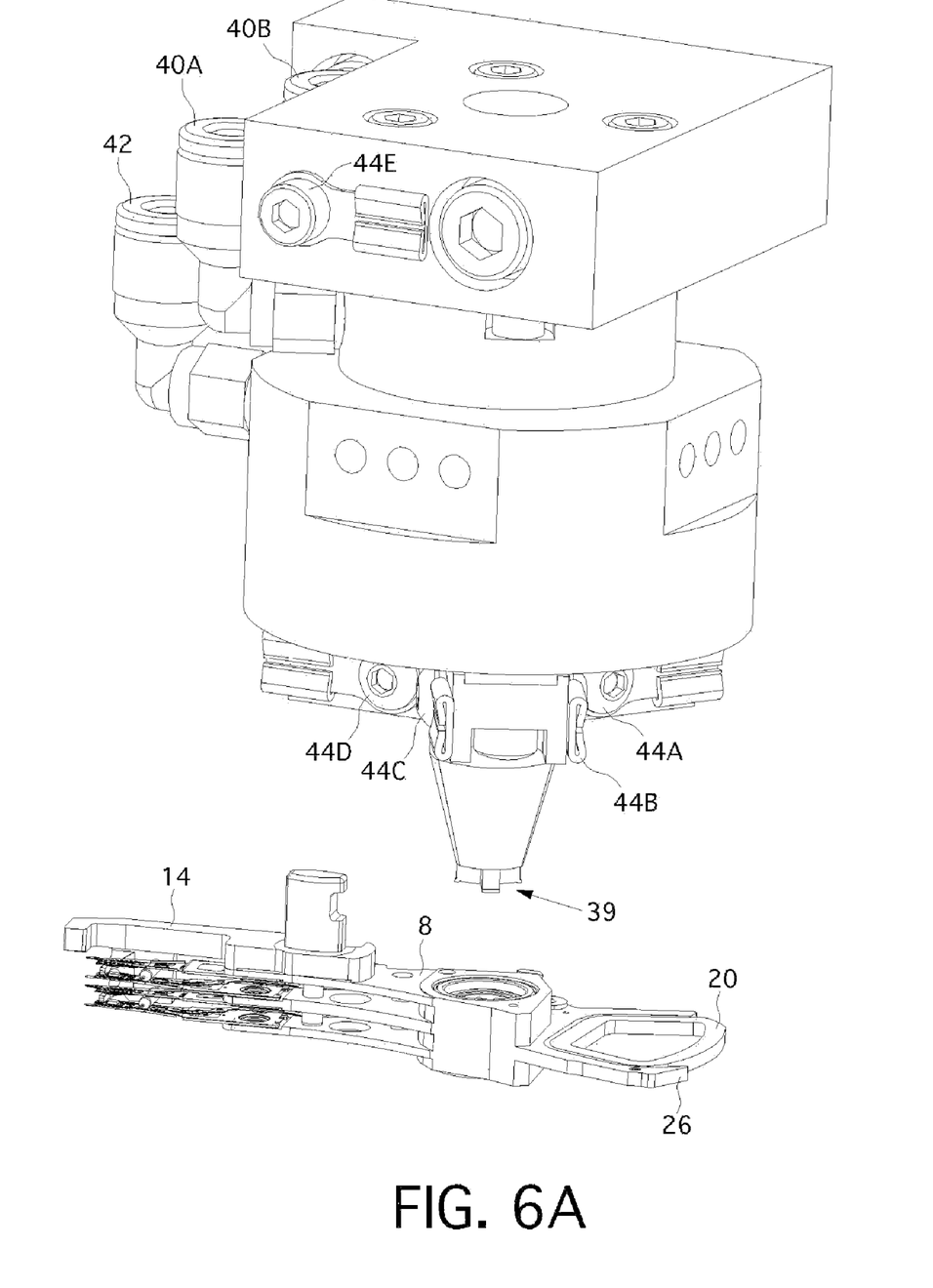
FIG. 6A shows a gripper according to an embodiment of the present invention for gripping the actuator arm prior to insertion into the base of the disk drive.
Figure 6B:
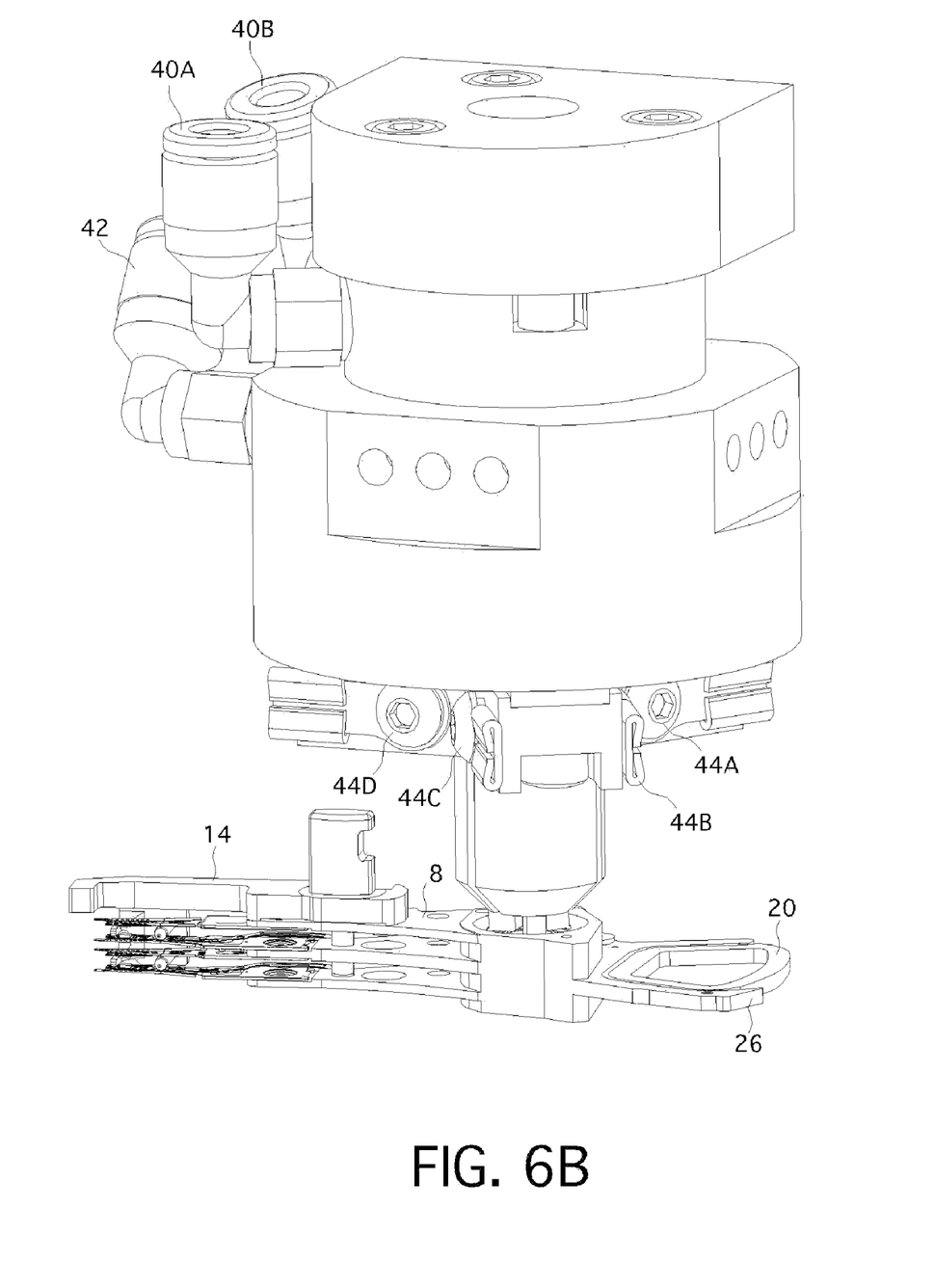
FIG. 6B shows the gripper gripping the actuator arm.

FIGS. 6A and 6B show an embodiment of the present invention wherein a gripper is used to grip the actuator arm 8 and install the actuator arm 8 into the base 2 of the disk drive. The gripper comprises a plurality of fingers 39 that are air actuated (expanded and contracted) using an input air terminal 40A and an output air terminal 40B. The gripper also comprises a scavenger vacuum air terminal 42 which sucks particle contaminants into an appropriate holding container to help prevent contaminating the manufactured disk drives. In addition, the gripper comprises a number of ring terminals (e.g., 44A-44E) for grounding the gripper to prevent electrostatic discharge from damaging the heads. The gripper is shown above the actuator arm 8 in FIG. 6A, and the gripper is shown gripping the actuator arm 8 in FIG. 6B.

Figure 7:
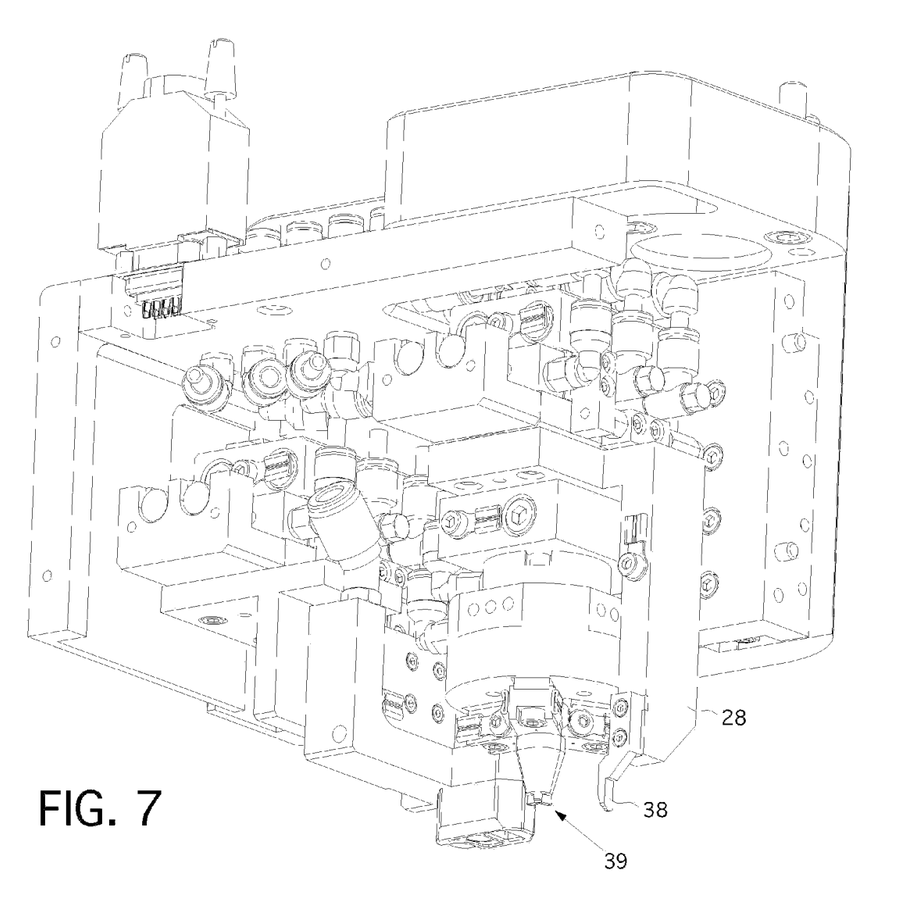
FIG. 7 shows an integrated assembly according to an embodiment of the present invention comprising a base actuated by a gantry, the gripper, and the pre-merge arm for biasing the actuator arm.

FIG. 7 shows an integrated assembly according to an embodiment of the present invention comprising the gripper (including fingers 39) and the pre-merge arm 27 (including body 28 and detachable component 38). The integrated assembly may be actuated in any suitable manner, such as by using a suitable gantry having x-y-z motion control. The integrated assembly further comprises suitable terminals for connecting to external air and vacuum sources, as well as suitable valves for controlling the air actuators of the gripper and pre-merge arm.

Figure 8:
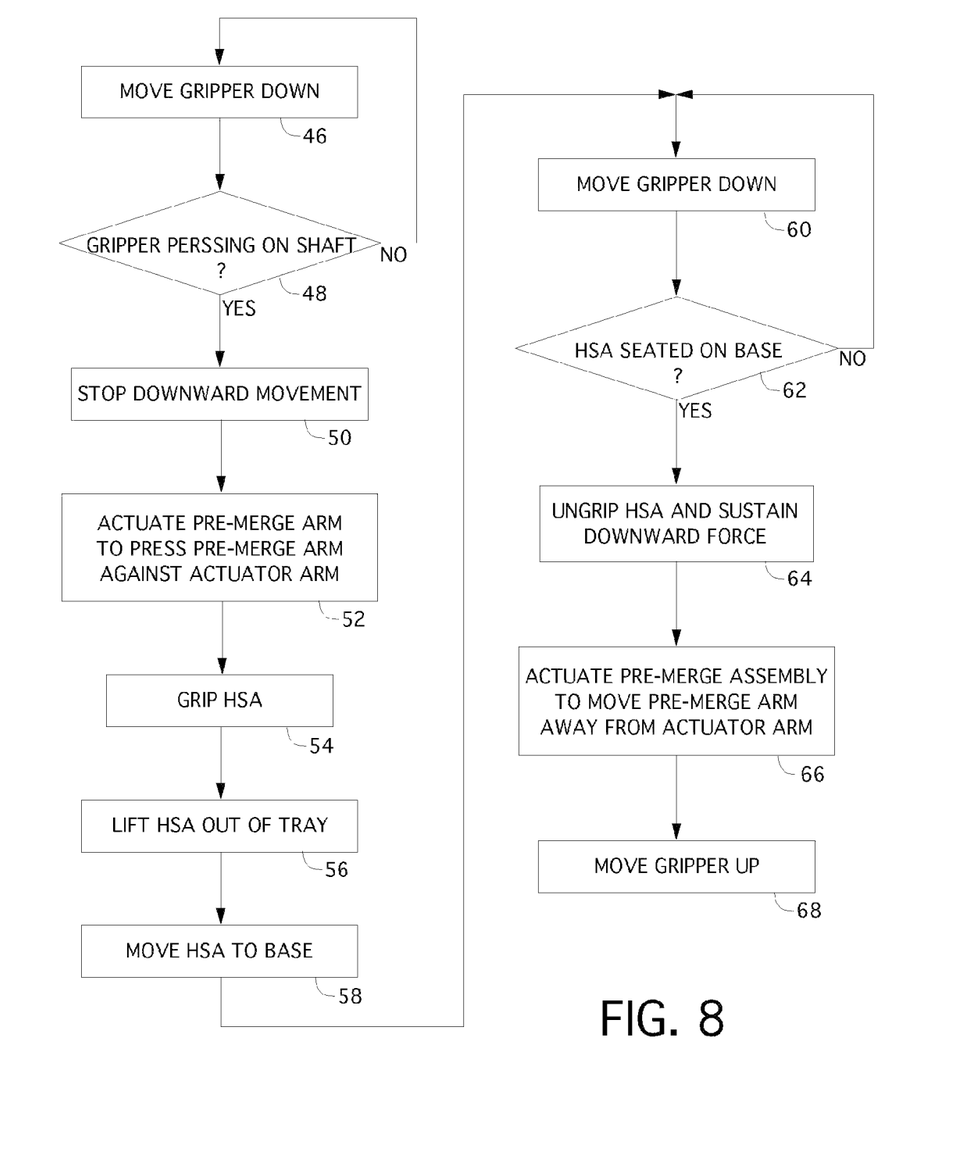
FIG. 8 is a flow diagram according to an embodiment of the present invention for installing the HSA into the base of the disk drive, and then removing the biasing applied to the actuator arm so that the lift tabs move toward and contact the ramp.

FIG. 8 is a flow diagram according to an embodiment of the present invention for installing the actuator arm 8 into the base 2 of the disk drive. The gantry of the integrated assembly (FIG. 7) positions the fingers 39 of the gripper over an HSA (typically held in a tray). The gantry then moves the gripper down (step 46) until the fingers 39 are pressing on the shaft of the actuator arm 8 (step 48). The downward movement is stopped (step 50) and the pre-merge arm 27 is actuated to press the contact surface 38 against the actuator arm 8 (as illustrated in FIG. 3A). The fingers 39 of the gripper are then actuated (expanded) in order to grip the actuator arm 8 (step 54). The HSA is then lifted out of the tray (step 56) and moved by the gantry over the base of the disk drive (step 58). The gantry then moves the gripper down (step 60) until the HSA is seated on the base 2 of the disk drive (step 62). The fingers 39 of the gripper are actuated (contracted) to ungrip the actuator arm 8 while sustaining downward force on the HSA (step 64). The pre-merge arm 27 is then actuated (step 66) to move the pre-merge arm 27 away from the actuator arm (as illustrated in FIG. 3B). The biasing force of the magnetic slug 26 interacting with the permanent magnet 22 rotates the actuator arm 8 so that the lift tabs 10 move toward and contact the ramp 6 (FIG. 3B), wherein the sustained downward force applied by the gripper ensures that the actuator arm 8 rotates near perfectly in-plane with the plane of the disks. The near perfect in-plane rotation of the actuator arm 8 helps protect the heads by ensuring the lift tabs 10 contact the ramp 6 with the desired orientation. Once the lift tabs 10 are contacting the ramp 6, the gantry moves the gripper up (step 68) and over the HSA tray to repeat the process for the next disk drive.

In one embodiment, the shaft of the actuator arm 8 is inserted over a machined post extending upward from the base 2. After moving the gripper away from the disk drive (step 68 of FIG. 8) a merge tool is used to merge the lift tabs 10 with the ramp 6 (move the lift tabs 10 into the parked position 18 on the ramp 6), and the shipping comb 14 is detached from the actuator arm 8. Thereafter a "top-down" screw is used to secure the shaft of the actuator arm 8 to the post (and in one embodiment the same screw is also used to secure a cover to the base 2). The "top-down" screw avoids the cost and complexity of fastening the actuator arm 8 using a screw inserted through the bottom of the base 2 as in the prior art (e.g., avoids needing to flip the disk drive over during the manufacturing process or driving a screw upside-down).

What is claimed is:

1. A manufacturing assembly for manufacturing a disk drive, the disk drive comprising a base, a disk, a ramp near an outer periphery of the disk, a head coupled to a distal end of an actuator arm, wherein the actuator arm comprises a lift tab and the actuator arm is rotatable about a pivot, the manufacturing assembly comprising:
   a pre-merge arm comprising a contact surface for contacting the actuator arm; and
   a first actuator operable to actuate the pre-merge arm, wherein:
      when installing the actuator arm into the base of the disk drive, the actuator is operable to actuate the pre-merge arm in a first direction so that the contact surface biases the actuator arm rotationally about the pivot to bias the lift tab away from the ramp; and
      after installing the actuator arm into the base of the disk drive, the first actuator is operable to actuate the pre-merge arm in a second direction opposite the first direction so that the lift tab moves towards and contacts the ramp.

2. The manufacturing assembly as recited in claim 1, wherein the lift tab moves substantially in-plane with the plane of the disk.

3. The manufacturing assembly as recited in claim 1, wherein:
   the pre-merge arm comprises a body and a detachable component coupled to the body; and
   the detachable component comprises the contact surface.

4. The manufacturing assembly as recited in claim 3, wherein the detachable component comprises a first metal.

5. The manufacturing assembly as recited in claim 4, wherein the body comprises a second metal having a hardness less than a hardness of the first metal.

6. The manufacturing assembly as recited in claim 1, wherein the disk drive further comprises a magnet operable to bias the actuator arm so that the lift tab moves towards and contacts the ramp after the first actuator actuates the pre-merge arm in the second direction opposite the first direction.

7. The manufacturing assembly as recited in claim 6, wherein the magnet forms at least part of a voice coil motor operable to actuate the actuator arm.

8. The manufacturing assembly as recited in claim 6, wherein the actuator arm comprises a magnetic slug operable to interact with the magnet.

9. The manufacturing assembly as recited in claim 1, further comprising a gripper operable to grip the actuator arm, and a second actuator operable to actuate the gripper toward the base of the disk drive, wherein the second actuator actuates the gripper to press the actuator arm onto the base of the disk drive, and thereafter the first actuator actuates the pre-merge arm in the second direction opposite the first direction so that the lift tab moves towards and contacts the ramp, and thereafter the gripper releases the actuator arm, and thereafter the second actuator actuates the gripper away from the actuator arm.

10. A method of manufacturing a disk drive, the disk drive comprising a base, a disk, a ramp near an outer periphery of the disk, and a head coupled to a distal end of an actuator arm, wherein the actuator arm comprises a lift tab and the actuator arm is rotatable about a pivot, the method comprising:
   when installing the actuator arm into the base of the disk drive, first biasing the actuator arm rotationally about the pivot to bias the lift tab away from the ramp; and
   after installing the actuator arm into the base of the disk drive, removing the first biasing so that the lift tab moves towards and contacts the ramp.

11. The method of manufacturing a disk drive as recited in claim 10, wherein the disk drive further comprises a magnet operable to bias the actuator arm so that the lift tab moves towards and contacts the ramp after removing the first biasing.

12. The method of manufacturing a disk drive as recited in claim 11, wherein the magnet forms at least part of a voice coil motor operable to actuate the actuator arm.

13. The method of manufacturing a disk drive as recited in claim 11, wherein the actuator arm comprises a magnetic slug operable to interact with the magnet.

14. A method of manufacturing a disk drive, the disk drive comprising a base, a disk, a ramp near an outer periphery of the disk, and a head coupled to a distal end of an actuator arm, wherein the actuator arm comprises a lift tab and the actuator arm is rotatable about a pivot, the method comprising:
   gripping the actuator arm;
   biasing the actuator arm rotationally about the pivot to bias the lift tab away from the ramp while moving the actuator arm toward the base of the disk drive;
   after installing the actuator arm into the base of the disk drive, removing the biasing; and
   ungripping the actuator arm so that the lift tab moves towards and contacts the ramp.

15. The method of manufacturing a disk drive as recited in claim 14, further comprising sustaining a downward force on the actuator arm while the lift tab moves towards and contacts the ramp.

16. The method of manufacturing a disk drive as recited in claim 14, wherein the lift tab moves substantially in-plane with the plane of the disk.

\* \* \* \* \*